(12) United States Patent
Drane

(10) Patent No.: US 7,075,005 B1
(45) Date of Patent: Jul. 11, 2006

(54) ELECTRICAL FLOOR BOX WITH DUAL COVER INSTALLATION

(75) Inventor: Mark R. Drane, Germantown, TN (US)

(73) Assignee: Thomas & Betts International, Inc., Wilmington, DE (US)

(*) Notice: Subject to any disclaimer, the term of this patent is extended or adjusted under 35 U.S.C. 154(b) by 0 days.

(21) Appl. No.: 11/131,076

(22) Filed: May 17, 2005

(51) Int. Cl.
    *H02G 3/08* (2006.01)

(52) U.S. Cl. .................. 174/50; 174/53; 174/58; 220/3.2; 220/3.3; 248/906

(58) Field of Classification Search .............. 174/50, 174/48, 49, 53, 57, 58, 17 R, 66, 67; 220/3.2, 220/3.3, 3.4, 3.5, 3.6, 3.7, 3.8, 3.9, 4.02, 220/241, 242; 248/906; D13/152; 439/535, 439/536, 925
See application file for complete search history.

(56) References Cited

U.S. PATENT DOCUMENTS

| | | | |
|---|---|---|---|
| 1,839,258 A * | 1/1932 | Phillips ................ | 220/3.8 |
| 2,445,197 A | 7/1948 | Wiesmann | |
| 2,931,533 A | 4/1960 | Wiesmann | |
| 2,975,559 A | 3/1961 | Hedgren | |
| 3,093,933 A | 6/1963 | Slingluff | |
| 3,181,277 A | 5/1965 | Slingluff | |
| 3,303,264 A | 2/1967 | Saul et al. | |
| 3,343,704 A | 9/1967 | Terry | |
| 3,943,272 A | 3/1976 | Carroll et al. | |
| 4,012,873 A | 3/1977 | Lindner | |
| 4,012,874 A | 3/1977 | Brogan et al. | |
| 4,331,832 A | 5/1982 | Curtis et al. | |
| 5,007,549 A | 4/1991 | Suk | |
| 5,257,487 A | 11/1993 | Bantz et al. | |
| 5,285,009 A * | 2/1994 | Bowman et al. ............ | 174/48 |
| 5,362,922 A * | 11/1994 | Whitehead ............... | 174/48 |
| 5,468,908 A * | 11/1995 | Arthur et al. ............. | 174/48 |
| 5,796,037 A * | 8/1998 | Young et al. ............. | 174/50 |
| 5,831,212 A | 11/1998 | Whitehead et al. | |
| 5,950,852 A | 9/1999 | Hudspeth et al. | |
| 6,072,121 A | 6/2000 | Penczak et al. | |
| 6,316,725 B1 | 11/2001 | Cole et al. | |
| 2006/0027386 A1* | 2/2006 | Drane | |

* cited by examiner

*Primary Examiner*—Angel R. Estrada
(74) *Attorney, Agent, or Firm*—Hoffman & Baron, LLP

(57) ABSTRACT

The present invention provides a floor box assembly including a housing, a ring assembly, and a temporary cover designed to be adaptable to use with various covers. The floor box is designed to accommodate various types or sizes of covers enabling the floor box to be installed when the type of cover has not yet been finalized.

33 Claims, 8 Drawing Sheets

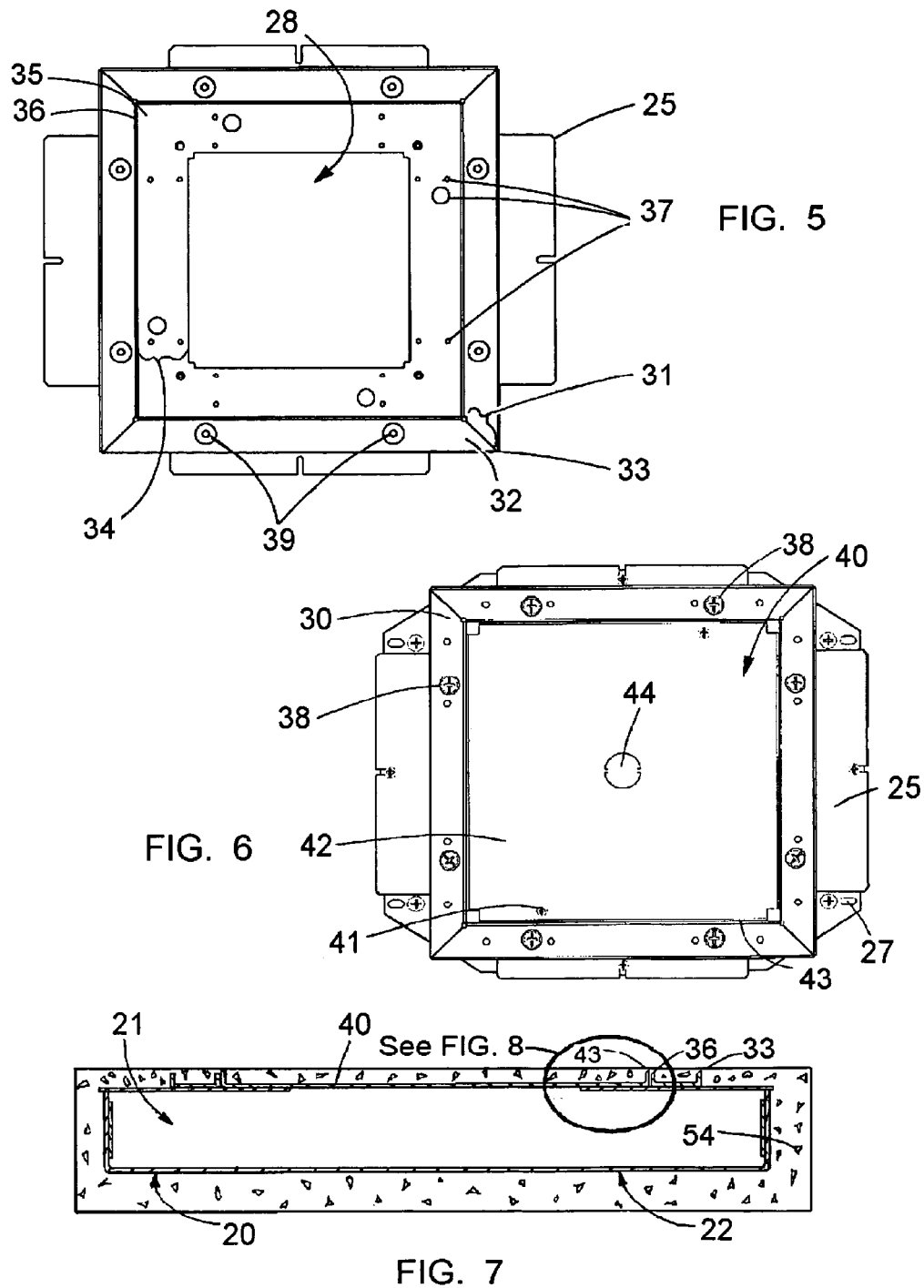

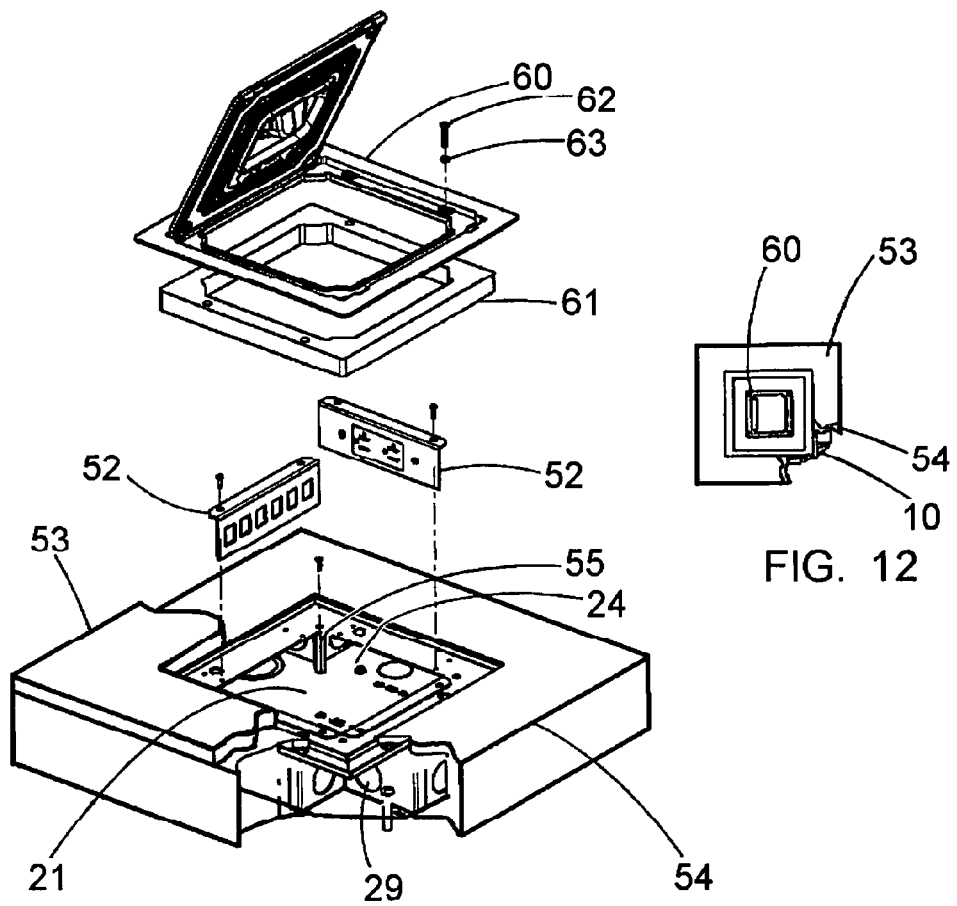
FIG. 11
FIG. 12
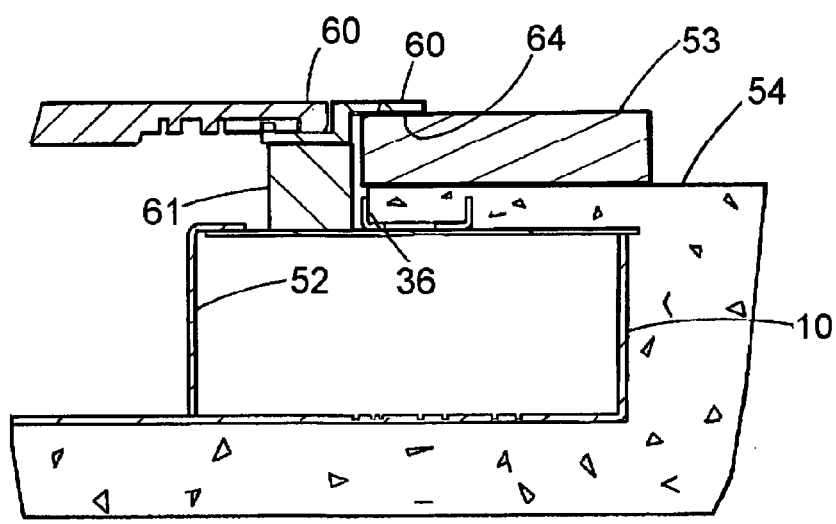
FIG. 13

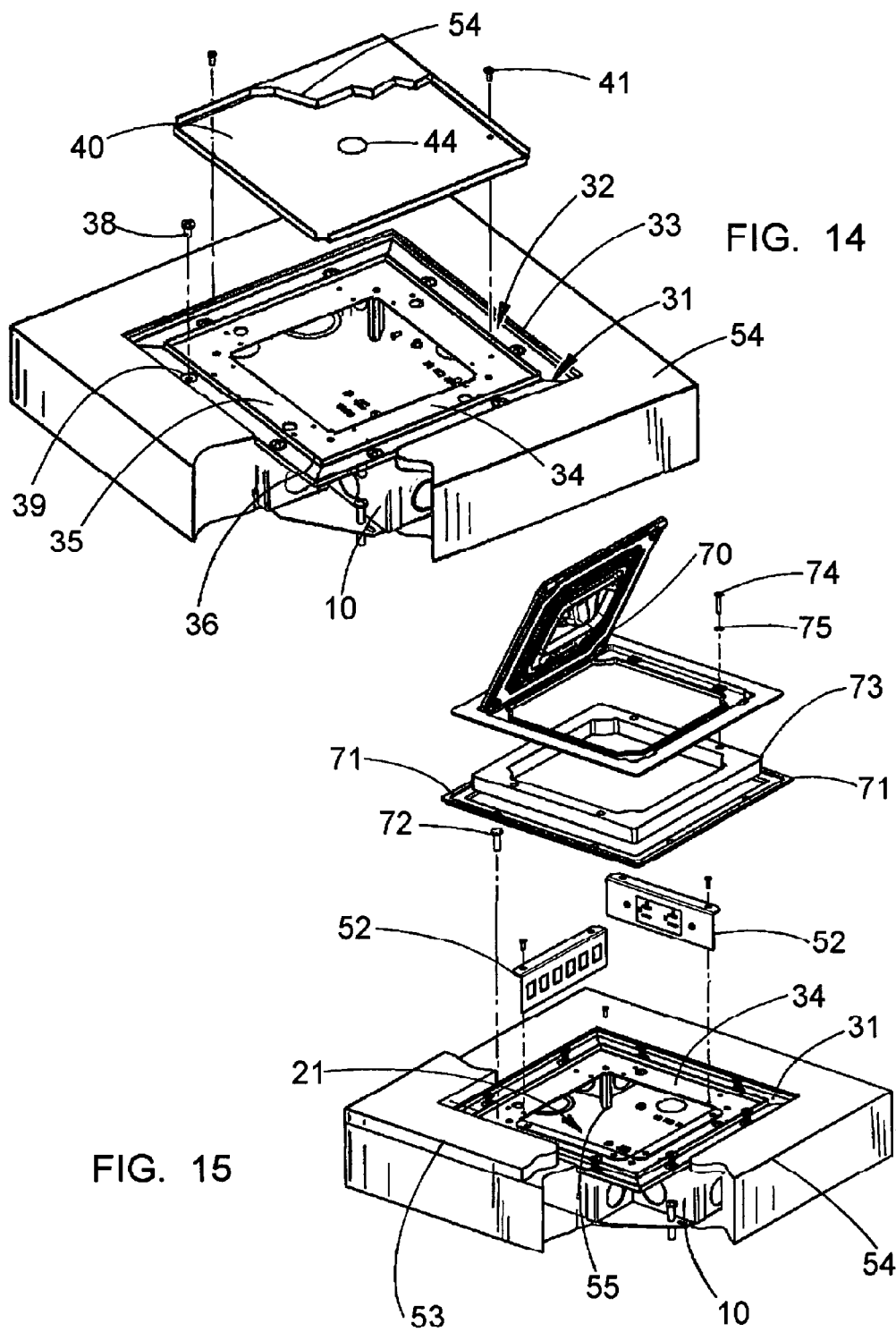

ELECTRICAL FLOOR BOX WITH DUAL COVER INSTALLATION

FIELD OF THE INVENTION

The present invention relates generally to recessed floor boxes which house power and communication wires or cables for termination. More specifically, the present invention relates to a recessed floor box assembly with capability to accept dual cover attachments, such as standard or flush mount covers.

BACKGROUND OF THE INVENTION

It is well known to run electrical wires and telecommunications wires underneath the surface of a floor. These cables and electrical systems may be placed under the floor surface so as to be more efficient in supplying power and data/telecommunication signals in commercial buildings. The electrical cables or wires beneath the floor may be accessed through a hole in the surface of the floor. In order to provide convenient access to the wires or cables as well as the termination devices which terminate the wires, a floor box is typically placed in the hole through the floor.

The cables are typically housed in ducts and/or conduit that are placed beneath the floor surface. These ducts are typically made of a metal, i.e. steel, iron, aluminum, etc., for structural rigidity to support the weight of the floor on top of the ducts. After the ducts are properly positioned in the floor, concrete then covers the ducts to create the actual floor surface. The thickness of the concrete floor, and the depth at which the ducts must be buried in the floor, are usually regulated by local building codes. The floor boxes may be integrated into the ducts before the concrete floor is poured. However, in most instances, the concrete floor is poured over the ducts and then holes are drilled into the floor to insert the floor boxes that are connected to the duct.

The use of floor boxes to access cables running underneath the surface of a floor is well known in the art. The floor boxes are typically made of a metallic material so that they are resistant to the outside elements, such as moisture, and are also strong enough to maintain the structural integrity of the floor. The floor boxes are typically welded together to further increase their strength.

Typically, the design of the floor box varies depending on the associated cover used therewith. Therefore, the type of cover to be used must be determined prior to the construction of the floor. The floor box designed for that cover is then incorporated in the construction of the floor, i.e. installed prior to pouring the concrete floor. Once the concrete has cured, the floor box is fixed in place and the associated cover is then attached. A different type of cover is not able to be installed because the floor box is specifically designed for attachment to only one type of cover.

Therefore, it is desirable to provide a single floor box assembly having the flexibility to accommodate various cover installations.

SUMMARY OF THE INVENTION

The present invention provides an electrical floor box with dual cover installation including a box, a ring assembly and a cover. The box includes an interior defined by a base, side walls and a top surface. The top surface has an access opening therethrough to provide access to the box interior. The ring assembly includes an inner ring and an outer ring. The inner ring includes an inner bottom surface and an inner rim about the inner bottom surface. The inner rim extends upwardly from a perimeter of said inner bottom surface. The inner ring is attached to the top surface of the box and extends around the access opening of the top surface. The outer ring includes an outer bottom surface and an outer rim about the outer bottom surface. The outer rim extends upwardly from a perimeter of the outer bottom surface. The outer ring is attached to the top surface of the box and extends around the inner ring. The cover has a planar portion and a flange thereabout. The cover is attached to the inner ring and has sufficient expanse to substantially cover the access opening. The cover has a flange about a planar portion.

The present invention further includes an electrical floor box with dual cover installation including a box, a ring assembly and a temporary cover. The box has an interior defined by a base, side walls and a top surface, and the top surface has an access opening therethrough to provide access to the interior of the box. The ring assembly includes a channel, the channel includes a pair of opposed rims and a planar portion extending therebetween. The opposed rims extend perpendicular to the planar portion. The channel is attached to the top surface of the box and extends around a portion of the top surface and the access opening. The portion of the top surface and one of the opposed rims provides for attachment of certain types of covers thereto. While the planar portion of the channel and the other opposed rims provides for attachment of different types of covers thereto. The temporary cover is attached to the inner portion of the top planar surface and has sufficient expanse to substantially cover the access opening.

Furthermore, the present invention includes a dual cover installation ring assembly including an inner ring, an outer ring and a temporary cover. The inner ring includes an inner planar surface having an access opening therethrough and an inner rim extending perpendicularly from the inner planar surface. The inner rim extends about the inner planar surface. The inner ring accommodates a variety of covers for attachment thereto. The outer ring includes an outer planar surface and an outer rim. The outer planar surface is attached to the inner planar surface and extending outwardly around the inner rim. The outer rim extends perpendicularly from the outer planar surface and the outer rim extends about the outer planar surface. The outer ring accommodates a variety of different covers then the inner ring. The temporary cover is attached to the inner planar surface of the inner ring and has sufficient expanse to substantially cover the access opening.

BRIEF DESCRIPTION OF THE DRAWINGS

FIG. 5 is a perspective top view of the top surface of the housing and ring assembly of the floor box assembly according to the present invention.

FIG. 6 is a perspective top view of the floor box assembly according to the present invention.

FIG. 7 is a cross-sectional view of the housing of the floor box assembly embedded in concrete according to the present invention.

FIG. 11 is a perspective view of a standard overlay cover installation of the floor box assembly according to the present invention.

FIG. 12 is a perspective top view of the floor box assembly of the present invention having a standard overlay cover attached thereto.

FIG. 13 is a partial cross-section view of the floor box assembly according to the present invention including a standard overlay cover attached thereto.

FIG. 14 is a perspective view of the floor box assembly according to the present invention embedded in concrete.

FIG. 15 is a perspective view of a flush cover installation of the floor box assembly according to the present invention.

DETAILED DESCRIPTION OF THE PREFERRED EMBODIMENTS

The present invention provides an floor box assembly for use in concrete floors which may or may not be topped with additional flooring such as tile, wood, etc. More particularly, the present invention is a floor box assembly with dual cover installation capabilities. The floor box is designed to accommodate various types or sizes of covers enabling the floor box to be installed when the type of cover has not yet been finalized.

Figure 1:
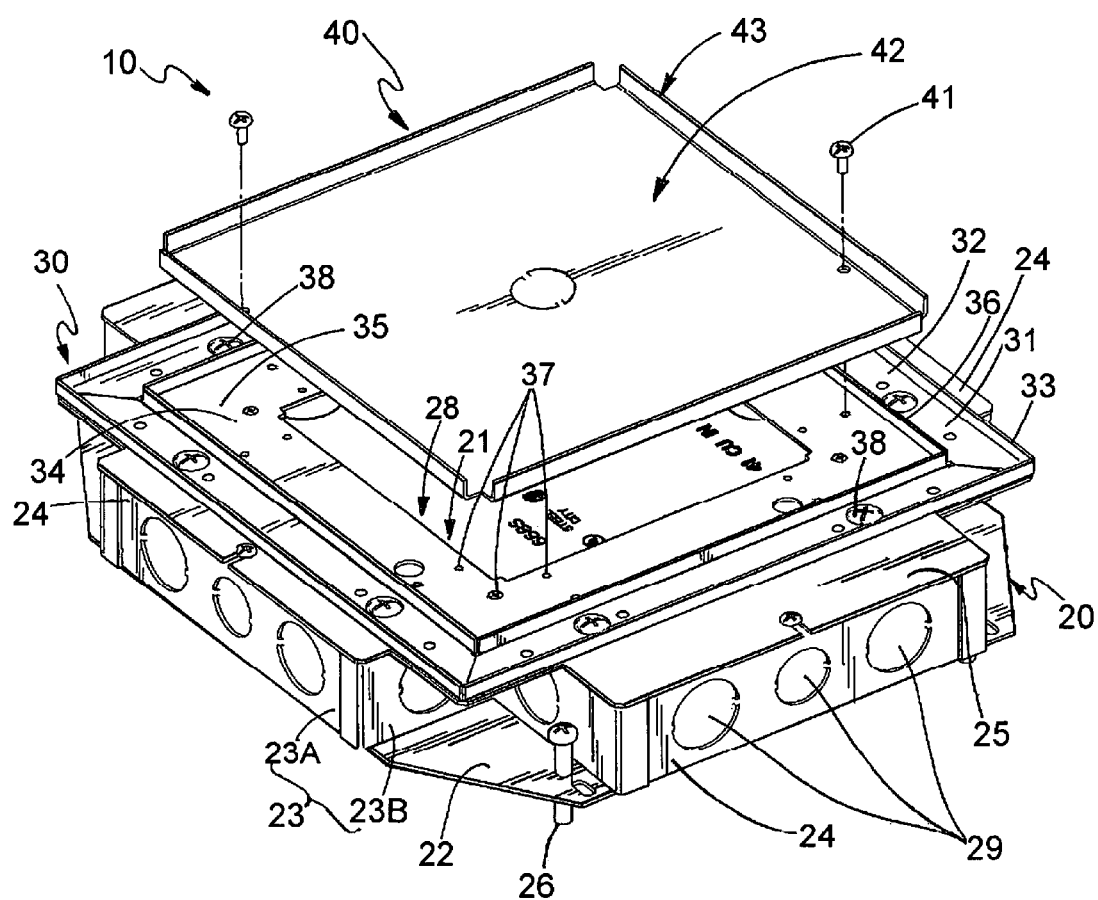
FIG. 1 is a perspective view of the floor box assembly including the housing, ring assembly and temporary cap according to the present invention.
Figure 2:
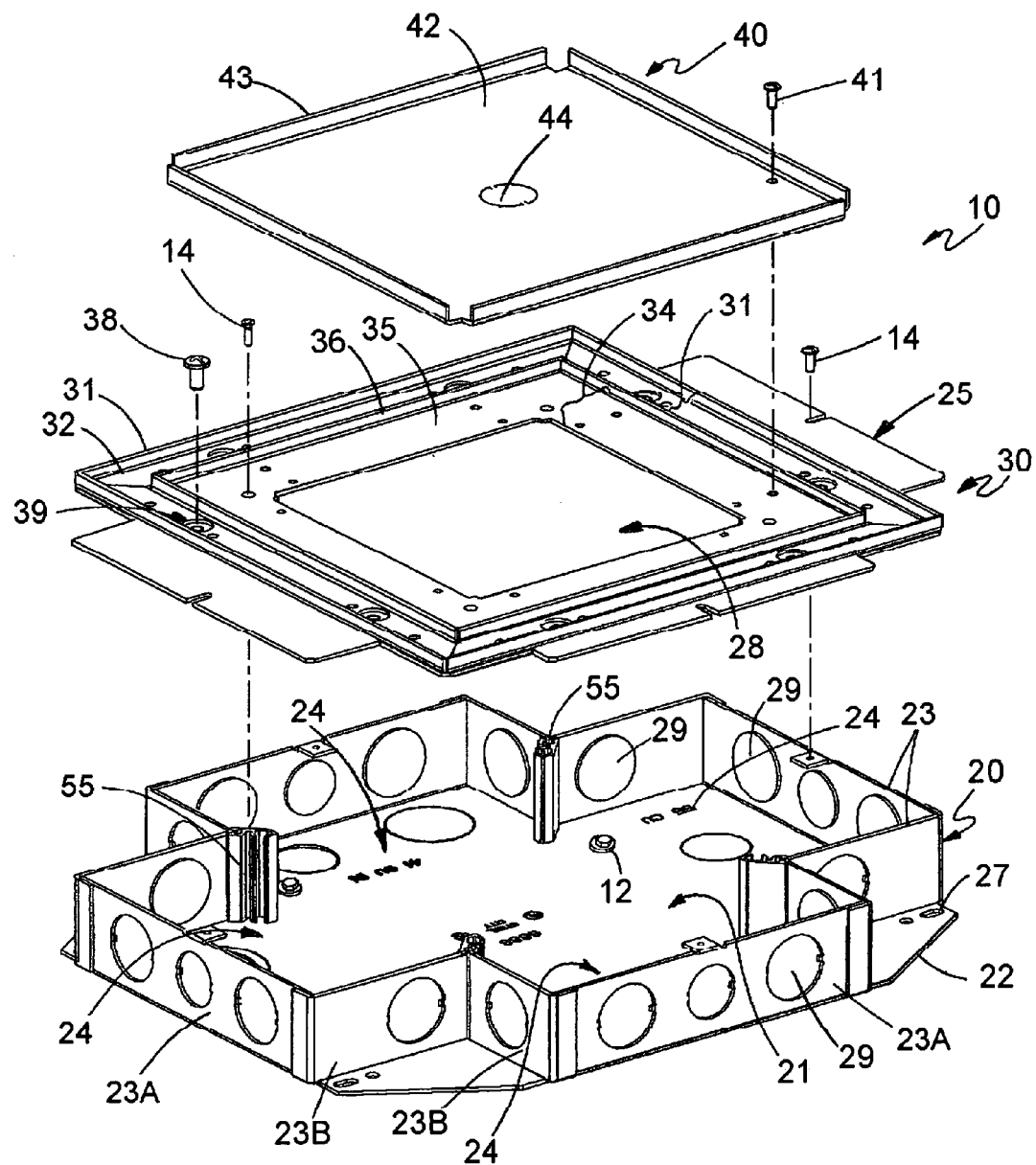
FIG. 2 is a exploded view of the floor box assembly of FIG. 1.
Figure 3:
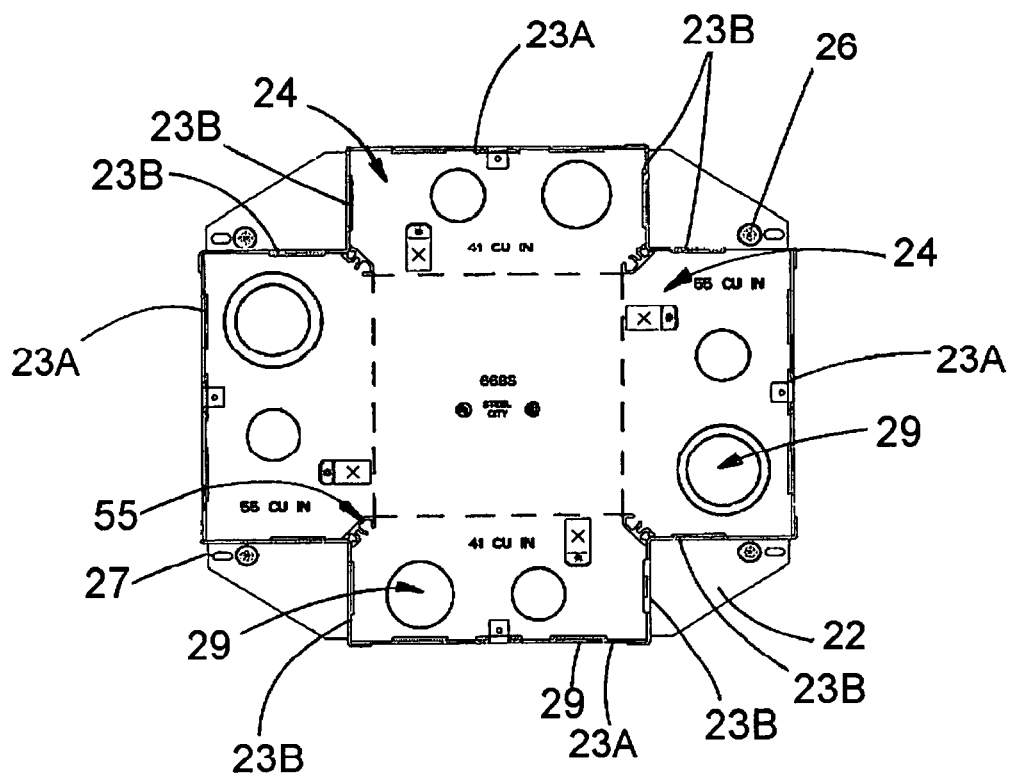
FIG. 3 is a perspective bottom view of the housing base of the floor box assembly according to the present invention.
Figure 4:
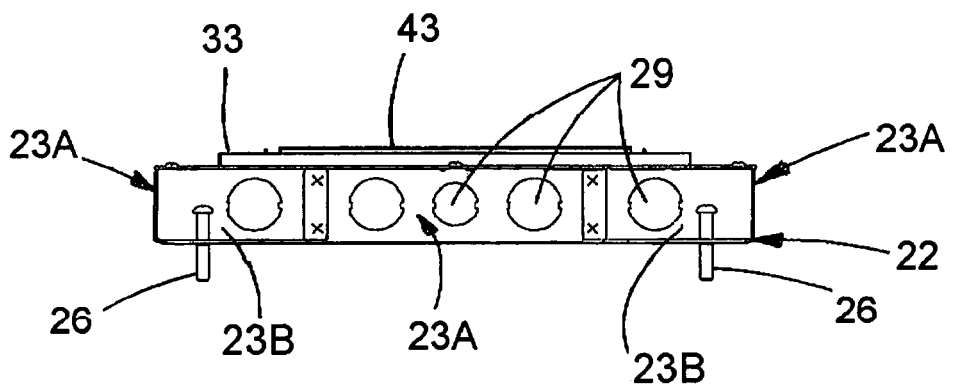
FIG. 4 is a perspective side view of the floor box assembly according to the present invention.

Referring to the FIGS. 1 and 2 there is shown a perspective view of the floor box assembly 10 of the present invention. The floor box assembly 10 includes a housing 20, a ring assembly 30 and a temporary cap 40. The housing 20 includes a generally cross-shaped housing interior 21 defined by a platform base 22, sidewalls 23 and a partially open top surface 25. FIGS. 2 and 3 show the platform base 22 as substantially planar and octagonal in shape providing excess material external to the housing interior 21 for leveling and stability purposes. The platform base 22 further includes grounding screws 12 for grounding the floor box housing 20. FIGS. 3 and 4 show leveling pins 26 which are provided to assist in positioning the box 10 on top of a sub-floor to the desired level prior to pouring the concrete floor. Slotted holes 27 are provided through the base 22 for securing the floor box to the sub-floor, as shown in FIGS. 2, 3 and 6.

The cross-shape of the housing interior 21 is generally defined as having four compartments 24 positioned 90 degrees from each adjacent compartment and extending outwardly from the center of the base 22, as shown in FIGS. 2 and 3. Each compartment 24 is defined by three sidewalls 23 protruding upwardly from the base 22. In the preferred embodiment, each compartment 24 includes one exterior sidewall 23A positioned at the perimeter edge of the base and two depending sidewall 23B on either side of the exterior sidewall 23A and generally perpendicular thereto. The depending sidewalls 23B extend inwardly toward the center of the octagonal-shaped base 22 and connect to the depending sidewalls 23B of an adjacent compartment 24 as shown in FIGS. 1–3. FIGS. 2 and 3 show divider connections 55 are located at each point of connection between depending sidewall 23B of adjacent compartments 25. The divider connections 55 provide a way to attach divider plates to the housing between 21 should it be necessary. A top surface 25 of the floor box 10 is designed to partially enclose the housing interior 21. The top surface 25 is generally cross-shaped with an open upper portion 28 located in the center to provide access to the housing interior 21. The top surface 25 is attached to sidewalls 23 via fasteners 14, and encloses the top of each compartment 24 as shown in FIGS. 1, 2 and 5. A ring assembly 30 frames the open upper portion 28 and allows for attachment of various covers thereto.

Figure 17:
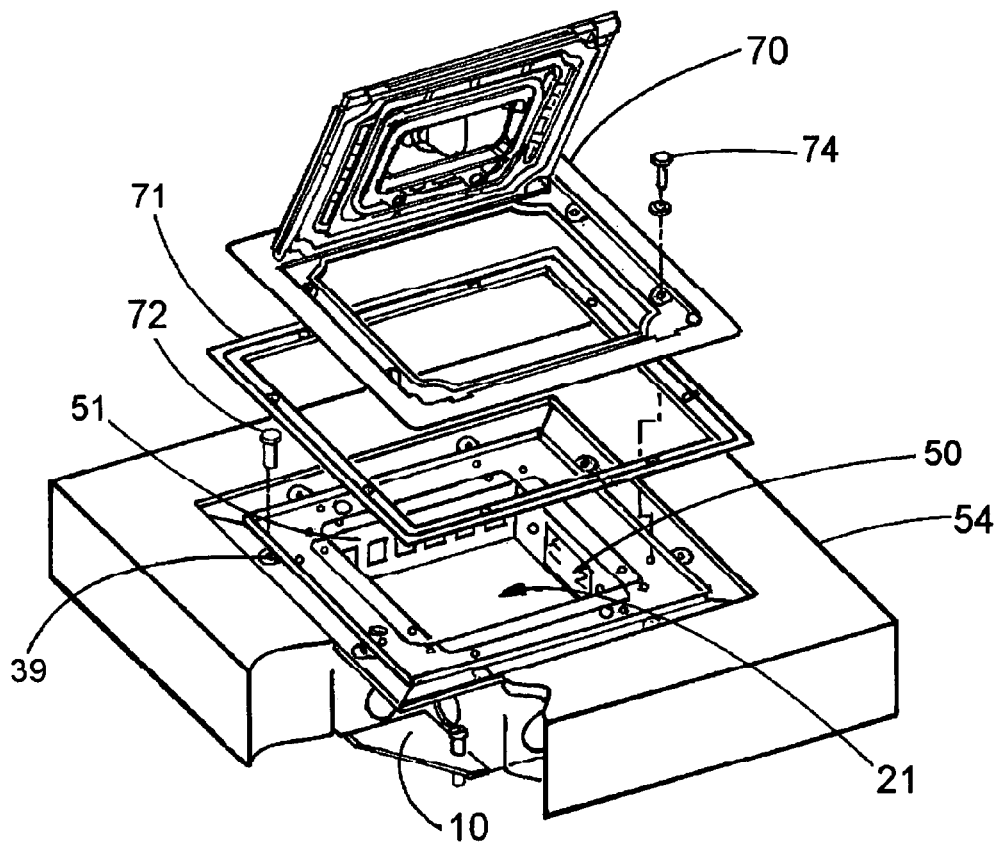
FIG. 17 is a perspective view of a flush cover installation of the floor box assembly according to the present invention.

As is particularly shown in FIGS. 1–4, sidewalls 23 and base 22 may include one or more conventional knockouts 29 to permit entry of wires and cables (not shown) into the housing interior 21 for termination purposes. As shown in FIGS. 11 and 17, interior compartments 24 accommodates various electrical termination devices 52 such as electrical receptacles 50 and data and communication jacks 51 which may be mounted therein in conventional fashion. Wires and cables which are inserted through knockouts 29 are terminated with mating plugs which permit the wires and cables to be connected to the termination devices within the housing interior 21.

As is well known, the housing 20 may be formed of a variety of materials both metallic and/or non-metallic. In the particular application shown here, housing 20 is formed of metal. It is further contemplated that while a cross-shaped housing is described herein, any shaped housing; such as square, circular, rectangular, octagonal, oval, channels, and those known in the art, may be adapted to accommodate the ring assembly as described herein.

Figure 16:
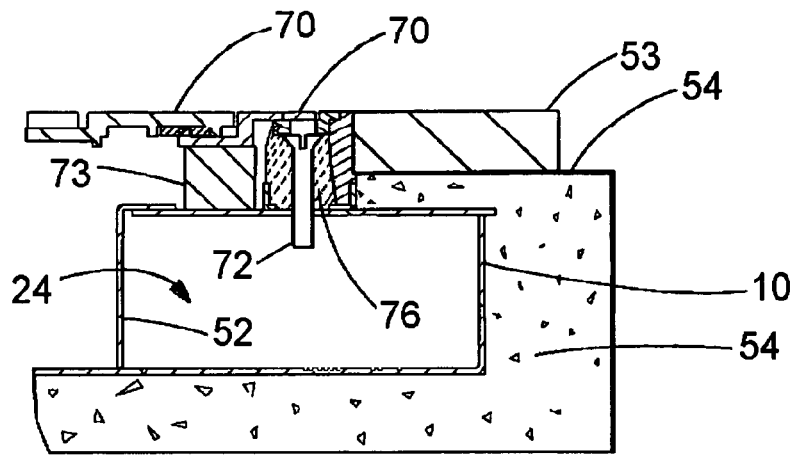
FIG. 16 is a partial cross-section view of the floor box assembly according to the present invention including a flush cover attached thereto.

The open upper portion 28 of the top surface 25 is surrounded by a ring assembly 30, as shown in FIGS. 1, 2 and 5. The ring assembly 30 is generally a U-shaped trough attached to the top surface 25 of the housing 20. The ring assembly 30 and the top surface 25 provide for an outer ring 31 and inner ring 34 to accommodate different types of covers. For example, the outer ring 31 may be used for attachment of a flush cover 70 and the inner ring 34 may be used for attachment of a standard overlay cover 60 as shown in FIGS. 13 and 16, respectfully. As shown in FIGS. 2 and 5, the ring assembly 30 is generally square in shape. However, it is contemplated that the ring assembly may vary in shape depending on the shape of the covers to be attached there to.

The inner ring 34 is substantially planar having an inner bottom surface 35 and inner rims 36 thereabout. The inner rims 36 extend upwardly about the inner bottom surface 35. The inner bottom surface 35 includes various apertures 37 to provide for attachment of cover components thereto. FIGS. 1, 2 and 5 show the outer ring 31 which surrounds the inner ring 34. The outer ring 31 includes an outer bottom surface 32 and outer rims 33 thereabout, similar in the construction to the inner ring 34. The outer bottom surface 32 of the outer ring 31 is substantially planar. FIGS. 1, 2, 14 and 17 show the outer bottom surface 33 includes plugs 38, such as screws, to plug attachment holes 39 during concrete pouring which may be used for attaching a cover component thereto. The outer rims 33 extend upwardly about the perimeter of the outer bottom surface 32 of the outer ring 31. The inner rims 36 and outer rims 33 may be of the same vertical height as shown in FIG. 7.

The ring assembly 30 may be a single molded component or individual rings attached together to form a complete assembly. The ring assembly 30 is connected to the housing 20 using various fastening methods such as welding. However, a single molded floor box assembly including a housing with a ring assembly integrally formed therein is also contemplated. The ring assembly 30 includes various apertures 37 to allow screw attachment of a cover and its components to the assembly 10, as shown in FIGS. 1, 2 and 5.

Figure 8:
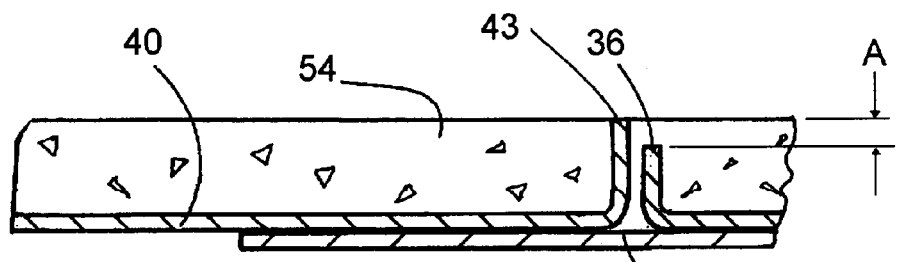
FIG. 8 is an enlarged view of FIG. 5 of the floor box assembly of the present invention.
Figure 9:
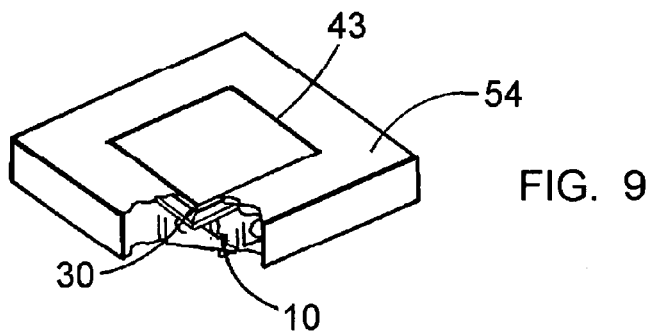
FIG. 9 is a perspective view of the floor box assembly embedded in concrete according to the present invention.
Figure 10:
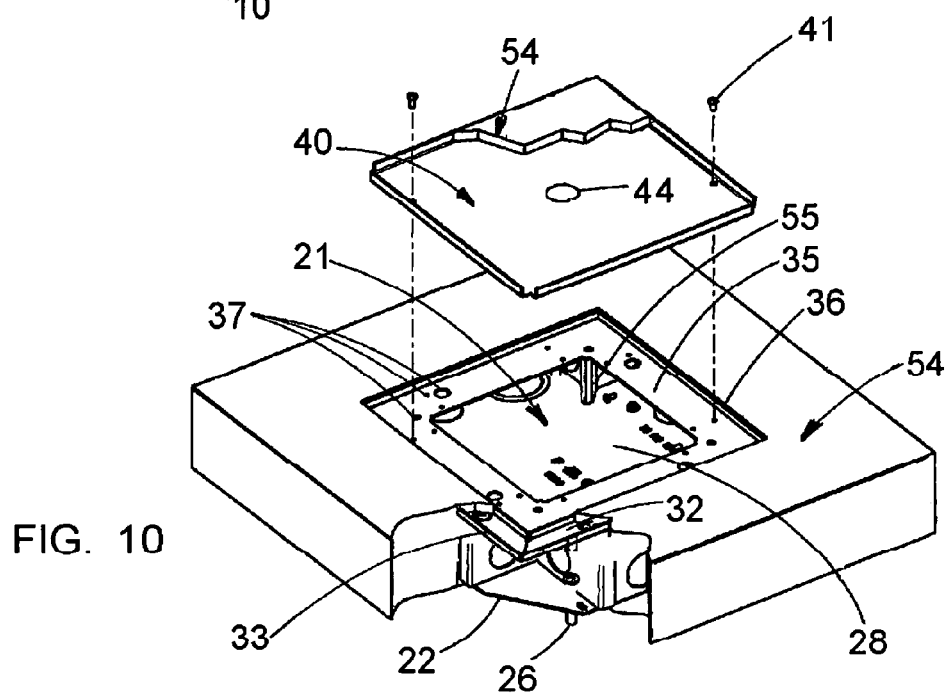
FIG. 10 is a perspective view of the floor box assembly of FIG. 9 according to the present invention.

A temporary cap 40 is seated on the inner ring 34 and over the open upper portion 28 to enclose the housing interior 21. The temporary cap 40 is attached to the ring assembly 30 via fasteners 41 as shown in FIGS. 1, 2 and 6. The temporary cap 40 is used during installation of the box 10 to prevent material such as debris, concrete and other contaminants from entering the housing interior 21 during the pouring of the concrete floor therearound. The temporary cap 40 includes a substantially planar portion 42 having perimeter flanges 43 thereabout. FIGS. 4, 7 and 8 show the flanges 43 extend upwardly beyond the rims 33, 36 of the ring assembly 30. The vertical height of the flanges 43 is slightly higher then the inner rims 36 and outer rims 33 to allow the concrete to cover the rims 33, 36 during installation of the box 10 and pouring of the concrete, as shown in FIGS. 7 and 8. The difference in elevation (A) between the edge of the rims 33, 36 and the edge of the flange 43 determines the depth allotted for the cover in comparison to the surface of the poured concrete flooring. The difference of the elevation (A) is usually between about 0.1 inches to about 0.3 inches, preferably about 0.125 inches. The cap 40 includes a finger access knock-out 44 for removal of the cap 40 from the housing 20 after the housing 20 is set in the concrete. The planar portion 42 of the temporary cap 40 is generally parallel to the surface of the concrete floor and it is positioned slightly below the surface of the floor. The concrete is poured to about the height of the perimeter flanges 43 or slightly above the flanges 43 such that the ring assembly 30 is embedded in the concrete, as shown in FIG. 9. After the concrete floor has hardened, the concrete above the temporary cap 40 is broken away and the temporary cap 40 is removed using the finger access 44 to provide access to the housing interior 21 and exposure of the inner ring 34 for standard overlay cover installation, as shown in FIGS. 10 and 14. Additional concrete may be broken away to expose the outer ring 31 for flush cover installation as further described below.

Floor Box Installation

The floor box installation is further described below. The floor box 10 is positioned on the sub-floor at the desired location. The knock-outs 29 are removed and the temporary cap 40 is removed for access to the housing interior 21. The conduits and fittings are run through the box and attached accordingly. The temporary cap 40 is replaced and secured to the inner ring 34 enclosing the open upper portion 28 prior to pouring the concrete. The box 10 is adjusted using the leveling pins 26 so that the flange 43 of the temporary cap 40 is properly positioned relative to the desired screed line of the concrete floor. Typically, the box 10 is adjusted such that the top edge of the flange 43 is about flush with the screened line of the poured concrete floor. However, the edge of the flange 43 may be installed up to about 0.07 inches below the screed line of the poured concrete floor. Once the box 10 is positioned at the desired level, it is secured to the sub-floor using traditional devices, such as wire or nails, through the slotted holes 27.

The concrete floor is then poured to the screened line to cover the floor box 10. The top edge of the flange 43 remains exposed as shown in FIGS. 7–9. Once the concrete has set, the concrete is chipped out and removed to expose the temporary cap 40. FIG. 10 shows the fasteners 41 of the temporary cap 40 are removed and the finger access 44 is punched out. The finger access 44 is used to remove the temporary cap 40 from the floor box 10. Further preparation of the floor box assembly 10 depends on the type and style cover desired for installation. Examples of specific types of floor cover installations are further described below.

A. Standard Cover Installation

FIG. 10 shows, the remaining concrete is chipped away and cleared out to the inner rims 36 of the inner ring 34. If desired, a finished floor, 53 i.e. hardwood, tile, carpet, etc., may be installed on top of the cured concrete floor 54 around the floor box open upper end 28 and the inner ring 34, as shown in FIGS. 11–13.

The floor box 10 is now ready for installation of a cover such as a standard overlay cover 60 as shown in FIG. 11. The installation of the cover is similar to that known in the art. Initially the wiring in the housing interior must be completed. The floor box 10 is wired in accordance with standard practicing, and national and local electrical codes. Generally, dividers may need to be installed depending on the types of conduits being installed therein. For example, electrical conductors and data cables may be routed between adjacent compartments 24 and dividers are required. The dividers are attached using the divider connection 55 in the housing interior 21. Power and data device panels 52 are then installed. Once the floor box 10 wiring is complete, the cover may now be installed. As shown in FIGS. 11–13, a gasket spacer 61 is placed on the inner bottom surface 35 of the inner ring 34 to provide adequate transition between the standard cover 60 and the floor. The standard cover 60 is placed on top of the gasket spacer 61 and is secured to the floor box 10, using screws 62 with o-rings 63 through the aperatures 37 provided through the inner ring 34. A sealant grout or caulking 64 may be used under a portion of the cover which lies on the floor surface to seal the standard cover 60 to the floor. The standard cover 60 may be installed directly on the cured concrete floor 54, or over a finished floor 53 depending on the desired application.

B. Flush Cover Installation

As shown in FIG. 14, the remaining concrete is chipped away and cleared out to the outer rims 33 of the outer ring 31. The concrete is cleared off of the heads of the screws 38. The screws 38 are removed to unplug the attachment holes 39 and allow for attachment of the flush cover 70 and associated components there through. If desired, a finished floor 53, i.e. hardwood, ceramic tile, etc., may be installed on top of the cured concrete floor 54 and around the outer ring 31, as shown in FIGS. 15 and 16.

The floor box 10 is now ready for installation of a cover such as a flush cover 70. Initially, the housing interior 21 is wired prior to attaching the flush cover 70 thereto. The floor box 10 is wired in accordance with standard practicing, and national and local electrical codes. Generally, dividers may need to be installed, electrical conductors, or data cables may be routed between adjacent compartments 24, using the divider connections 55. Power and data device panels 52 are installed. Once the floor box wiring is complete, the flush cover 70 is then installed. Referring to FIGS. 15–17, a flush trim ring 71 is installed over the outer bottom surface 32 of the outer ring 31. Trim leveling screws 72 are installed with the trim ring 71, through the attachment holes 39 of the outer ring 31. The trim ring 71 is leveled to the floor surface using the trim leveling screws 72. FIG. 15 shows a gasket spacer 73 is placed on top of the inner ring 34 to provide transition between the flush cover 70 and the finished floor 53. The flush cover 70 is placed over the gasket spacer 73. The flush cover 70 and the gasket spacer 73 are secured to the floor box 10 using cover mounting screws 74 with o-rings 75 through apertures 37 provided through the inner bottom surface 35 of the inner ring 34. Typically, a sealant grout or caulking 76 is used under the flange of the flush cover 70 to seal the flush cover 70 to the finished floor 53.

The flush cover 70 may be mounted to the finished floor 53 or directly to the cured concrete 54. If the flush cover is mounted directly to the cured concrete 54, then a gasket spacer 73 may not be necessary and the flush cover 70 is directly attached to the trim 71 as shown in FIG. 17.

While the particular embodiments of the present invention has been shown and described, it will be obvious to those skilled in the art that changes and modifications may be made without departing from the teachings of the invention. The matter set forth in the foregoing description and accompanying drawings is offered by way of illustration only and not as a limitation. The actual scope of the invention is intended to be defined in the following claims when viewed in their proper perspective based on the prior art.

What is claimed is:

1. An electrical floor box with dual cover installation comprising:
   (a) a box having an interior defined by a base, side walls and a top surface, said top surface having an access opening there through to provide access to said interior of said box;
   (b) a ring assembly comprising:
      (i) an inner ring comprising an inner bottom surface and an inner rim around said inner bottom surface, said inner rim extending upwardly from a perimeter of said inner bottom surface, said inner ring attached to said top surface of said box and extending around said access opening of said top surface to provide for attachment of various covers thereon; and
      (ii) an outer ring comprising an outer bottom surface and an outer rim around said outer bottom surface, said outer rim extending upwardly from a perimeter of said outer bottom surface, said outer ring attached to said top surface of said box and extending around said inner ring to provide for attachment of different various covers; and
   (c) a cover having a planar portion and a flange thereabout, said cover being attached to said inner ring and having sufficient expanse to substantially cover said access opening, said cover having said flange around said planar portion.

2. The electrical floor box with dual cover installation of claim 1, wherein said cover includes a finger access knock-out on said planar portion.

3. The electrical floor box with dual cover installation of claim 2, wherein said cover and said inner ring are removeably attached via fasteners.

4. The electrical floor box with dual cover installation of claim 1, wherein said inner bottom surface of said inner ring includes apertures for attaching said various covers thereto.

5. The electrical floor box with dual cover installation of claim 1, wherein said flange of said cover has a vertical elevation from said planar portion and said inner rim and said outer rim have vertical heights, wherein said vertical elevation is greater then said vertical heights.

6. The electrical floor box with dual cover installation of claim 5, wherein a difference between said vertical elevation and said vertical height of said inner rim is between about 0.1 inches to about 0.3 inches.

7. The electrical floor box with dual cover installation of claim 5, wherein a difference between said vertical elevation and said vertical height of said outer rim is between about 0.1 inches to about 0.3 inches.

8. The electrical floor box with dual cover installation of claim 5, wherein said vertical heights are substantially the same.

9. The electrical floor box with dual cover installation of claim 1, wherein said interior of said box is cross-shaped.

10. The electrical floor box with dual cover installation of claim 8, wherein said interior includes divider connections therein to provide a mechanism to attach divider plates thereto.

11. The electrical floor box with dual cover installation of claim 1, wherein said various covers are overlay covers.

12. The electrical floor box with dual cover installation of claim 1, wherein said different various covers are flush covers.

13. An electrical floor box with dual cover installation comprising:
   (a) a box having an interior defined by a base, side walls and a top surface, said top surface having an access opening there through to provide access to said interior of said box;
   (b) a ring assembly comprising a channel, said channel including a pair of opposed rims and a planar portion extending there between, said opposed rims extending perpendicular to said planar portion, said channel is attached to said top surface and extending around a portion of said top surface and said access opening, said portion of said top surface and one of said opposed rims provides for attachment of various covers thereto, and said planar portion of said channel and the other said opposed rims provides for attachment of different types of covers thereto; and
   (c) a temporary cover attached to said portion of said top surface and having sufficient expanse to substantially cover said access opening.

14. The electrical floor box with dual cover installation of claim 13, wherein said temporary cover comprises a planar surface and a vertically rising flange thereabout, said planar surface includes a finger access knock-out therein.

15. The electrical floor box with dual cover installation of claim 14, wherein said temporary cover and said portion of said top surface are removeably attached via fasteners.

16. The electrical floor box with dual cover installation of claim 13, wherein said portion of said top surface includes apertures for attachment of said various covers thereto.

17. The electrical floor box with dual cover installation of claim 16, wherein said various covers are overlay covers.

18. The electrical floor box with dual cover installation of claim 13, wherein said planar portion of said channel includes apertures for attachment of said different types of covers thereto.

19. The electrical floor box with dual cover installation of claim 18, wherein said different types of covers are flush covers.

20. The electrical floor box with dual cover installation of claim 13, wherein said temporary cover comprises a flange having a vertical elevation and said opposed rims have perpendicularly rising heights, wherein said vertical elevation is greater than said perpendicularly rising heights.

21. The electrical floor box with dual cover installation of claim 20, wherein the difference of said vertical elevation of said flange and said perpendicularly rising heights of said opposed rims is between about 0.1 inches to about 0.3 inches.

22. The electrical floor box with dual cover installation of claim 21, wherein said perpendicularly rising heights of said opposed rims are substantially the same.

23. The electrical floor box with dual cover installation of claim 13, wherein said interior of said box is cross-shaped.

24. The electrical floor box with dual cover installation of claim 22, wherein said interior includes divider connections therein to provide a mechanism to attach divider plates therein.

25. A dual cover installation ring assembly comprising:
   (a) an inner ring comprising:
      (i) an inner planar surface having an access opening there through, and
      (ii) an inner rim extending perpendicularly from said inner planar surface, said inner rim extending around said inner planar surface;
   (b) an outer ring comprising:
      (i) an outer planar surface attached to said inner planar surface and extending outwardly around said inner rim, and
      (ii) an outer rim extending perpendicularly from said outer planar, said outer rim extending around said outer planar surface; and
   (c) a temporary cover attached to said inner planar surface of said inner ring and having sufficient expanse to substantially cover said access opening, wherein said inner ring has a geometric configuration to provide for attachment of various covers thereon, and said outer ring has a geometric configuration to provide for attachment of different various covers thereon.

26. The dual cover installation ring assembly of claim 25, wherein said temporary cover includes a finger access knock-out thereon.

27. The dual cover installation ring assembly of claim 26, wherein said temporary cover and said inner planar surface are removeably attached via fasteners.

28. The dual cover installation ring assembly of claim 25, wherein said inner planar surface of said inner ring includes apertures for attachment to a floor box housing.

29. The dual cover installation ring assembly of claim 25, wherein said temporary cover has a flange thereabout, said flange having a vertical elevation, said inner rim having a perpendicularly rising elevation, wherein said vertical elevation being greater then said perpendicularly rising elevation of said inner rim.

30. The dual cover installation ring assembly of claim 29, wherein a vertical difference between said vertical elevation and said perpendicularly rising elevation is between about 0.1 inches to about 0.3 inches.

31. The dual cover installation ring assembly of claim 29, wherein said outer rim has an perpendicularly rising elevation, wherein said perpendicularly rising elevations of said inner rim and outer rim are substantially the same.

32. The dual cover installation ring assembly of claim 25, wherein said various covers are overlay covers.

33. The dual cover installation ring assembly of claim 25, wherein said different various covers are flush covers.

* * * * *